Jan. 21, 1964     J. M. BLOCHER, JR     3,118,737
FLOW SEAL SYSTEMS
Filed May 19, 1960

John M. Blocher, Jr.
INVENTOR

BY Louis Sheldon
ATTORNEY

United States Patent Office 3,118,737
Patented Jan. 21, 1964

3,118,737
FLOW SEAL SYSTEMS
John M. Blocher, Jr., Columbus, Ohio, assignor, by mesne assignments, to the United States of America as represented by the Secretary of the Navy
Filed May 19, 1960, Ser. No. 30,391
7 Claims. (Cl. 23—252)

This invention relates to seals, and is concerned more particularly with the sealing of a chamber in which a chemical reaction is to take place.

In a system including a chamber in which a chemical reaction is to take place under negative or positive pressure and a pump for establishing the pressure, the pump may be run continuously to compensate for leakage and thus maintain the desired degree of pressure in the chamber. However, in order to preclude undesired loss of gases and to minimize the running of the pump, it is conventional to interpose a stopcock in the line between the chamber and the pump. If the reaction is to be carried out at a temperature which will break down the grease or other sealing agent of the stopcock, the length of the line between the chamber and the stopcock could be made so great that the temperature at the stopcock would be low enough not to appreciably affect the stopcock sealing agent. However, it is desirable to minimize the length of line. Moreover, if the reactants or reaction products are such that their vapors will chemically attack the stopcock sealing agent, the stopcock is undesirable regardless of the length of the line.

It is accordingly an object of this invention to provide a seal which will not break down at temperatures which would destroy the effectiveness of a stopcock.

Another object is to provide a sealing agent which is immune to chemical attack by any of the reactants or reaction products.

Another object is to provide a system using a sealing agent which is heated to a molten state, moved to sealing position, solidified or allowed to solidify in sealing position, and remelted and moved out of sealing position for reuse.

Further objects and advantages of the invention will appear as the description proceeds.

The invention will be better understood on reference to the following description and the accompany drawing, wherein.

Figure 1:
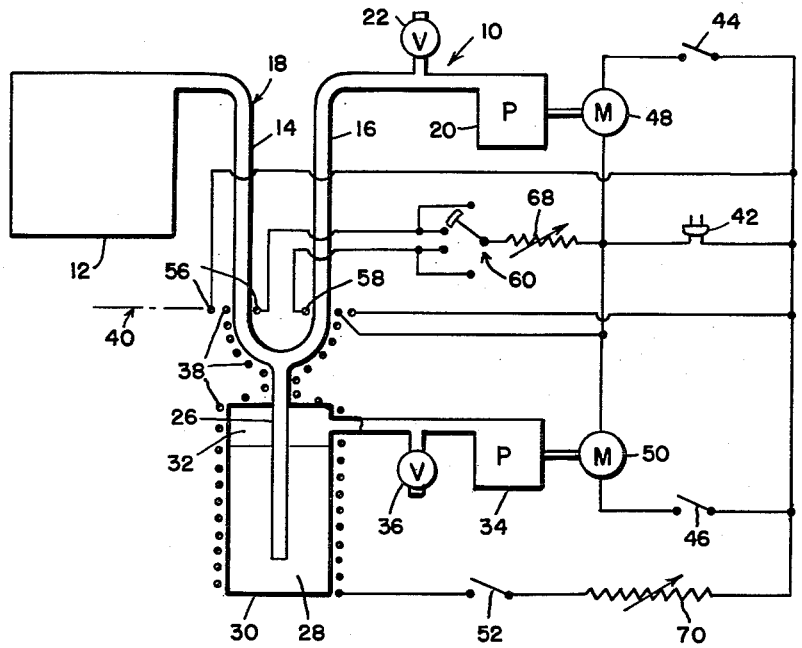
FIG. 1 is a schematic view of a vacuum or pressure system embodying features of the invention, with the system unsealed.

Referring now more particularly to the drawing, disclosing an illustrative embodiment of the invention, there is shown at 10 a system comprising a chamber or tank 12 adapted to contain reactants (not shown) which are to undergo chemical reaction. The reaction may take place at a temperature at which the grease or other sealing agent of a stopcock would break down, or one or more of the reactants or reaction products may be of such character as to chemically attack the stopcock sealing agent and thus render the stopcock leaky. The chamber 12 is connected by the arms 14 and 16 of a Y-tube 18 to a pump 20, a valve 22 being interposed in the line between the arm 16 and the pump. The arms 14 and 16 extend upward from the tube juncture 24, and the tube stem 26 depends from the juncture and projects down into and is immersed in a sealing agent 28 in a reservoir, such as a vessel 30 having a space 32 where it is connected to a pump 34, a valve 36 being interposed in the line between the vessel and the pump. The valve 36 may be opened and closed at will, and the size of its opening may be adjustable. A heater coil 38 extends along the vessel 28 and the tube arms 14 and 16 to a suitable level above the tube juncture 24.

The sealing agent 28 is preferably chemically and catalytically inert, with a negligible vapor pressure in the liquid state, even under vacuum, and immune to high reaction temperatures. In accordance with the invention, the sealant 28 is solid at the reaction temperature and will melt at a higher temperature which is preferably not very high above the reaction temperature. The melting points of the tube 18 and vessel 30 are substantially higher than that of the sealant 28.

The sealant 28 could be introduced into the vessel 30 in any suitable manner. For example, it could be introduced in powder or granular form and then heated as by the coil 38, which could be a resistance coil or an RF induction heating coil, to a liquid state to enter the lower part of the stem 26 and then allowed to cool to a solid state. Or, the sealant 28 may be preheated to a molten state and then poured into the vessel 30 and allowed to solidify. In FIG. 1 it is apparent that the liquid or solid sealant 28 in the stem 26 is at a level at which the sealant does not seal the arms 14 and 16 from each other.

With the arrangement shown, the desired reactants are introduced into the chamber 12 through a suitable opening (not shown) and the chamber then sealed thereat in any suitable manner forming no part of this invention.

It will first be assumed that the system is a vacuum system, and accordingly that the pumps 20 and 34 are vacuum pumps.

Figures 2, 3, 4, 5:
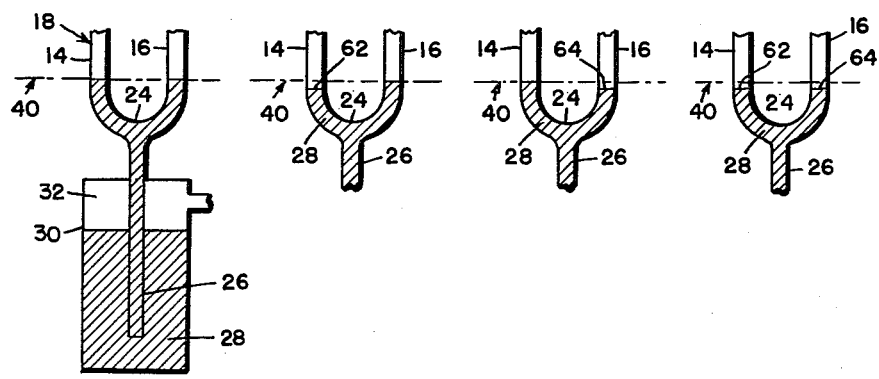
FIG. 2 shows a portion of FIG. 1 but with the system sealed.
FIGS. 3 to 5 are similar to FIG. 2 but show modifications of the seals.

The pump 20 is now operated until the desired vacuum is established in the chamber 12, and the pump 34 is operated until the same or nearly the same vacuum is established in the vessel space 32. The coil 38 is then energized and the sealant 28 thereby liquified. If the pressure in the vessel space 32 is then equal to, or slightly greater or less than, the pressure over the liquid sealant in the tube stem 26, the liquid sealant in the stem will not move, or will rise or descend slightly, as the case may be. The valve 36 is then actuated just enough to allow sufficient gas to enter the vessel space 32 to provide the balance of pressure necessary to raise the liquid sealant in the tube stem 26 until the liquid sealant fills the tube above the juncture 24 to a suitable level, for example the level at the top of the coil 38 as indicated by the dot-dash line 40, thus sealing the arms 14 and 16 from each other and thereby sealing the tube side of the chamber 12. Thereupon the coil 38 is deenergized and the sealant is cooled or allowed to cool to a solid state in sealing position (FIG. 2). Now the reaction in the chamber 12 can be commenced. When the reaction is completed, the pump 34 is run until substantially the original vacuum is established in the vessel space 32, and then the coil 38 is energized to melt the solid sealant. When melting is complete, the sealant gravitates to, or substantially to, its original level in the stem 26 and vessel 30. Then the coil 38 is de-energized and the sealant allowed to resolidify. When the sealant has thus resolidified, the valve 22 is opened to establish ambient atmospheric pressure in the chamber 12, and then the chamber is opened and the reaction products removed, essentially completing a cycle of operation. The valve 36 may be kept closed when the valve 22 is opened, or it may be opened if desired to establish ambient atmospheric pressure over the sealant in the vessel space 32.

The tube arms 14 and 16 and the stem 26 could be very short, on the order of a few inches.

The system may include pressure gages (not shown) suitably located to indicate the pressures in various parts of the system.

The pumps 20 and 34 and heating coil 38 may be powered and controlled by circuitry including a plug 42 adapted to be plugged in an electrical outlet socket (not shown), switches 44 and 46 for the respective pump motors 48 and 50, and a switch 52 for the coil 38. The valves 22 and 36 may be operated by hand or otherwise.

Although a wide range of substances may be available for use as the sealing agent 28, its melting point in accordance with the form of the invention under discussion should be sufficiently high to insure that it will not be melted by heat from the chamber 12; it should be chemically and catalytically inert and its vapor pressure in the liquid and solid states should be negligible so that the sealing agent will not appreciably affect or be affected by the reactants or the reaction products; and its coefficient of expansion should be in such relation to that of the tube 18 that, on solidifying, the sealing agent will not contract away from the tube, and preferably will tend to expand, or neither expand nor contract, to insure a good seal.

Stopcock sealing agents break down at about 200° C. For a system operating at reaction temperatures inimical to stopcock efficiency, the invention under appropriate conditions could be practiced using some such sealing agent as tin, having a melting point of 232° C.; bismuth, having a melting point of 271° C.; cadmium, having a melting point of 320° C.; or lead, having a melting point of 327° C.; or solder or similar alloy, particularly one containing bismuth or other metal or metals which have a tendency to expand somewhat on solidifying, so as to provide a tight leak-proof closure. Another suitable sealing agent could be a mixture of lithium bromide and potassium bromide, the eutectic of which has a melting point of about 360° C. For substantially lower reaction temperatures, Wood's metal, titanium tetrabromide, or other suitable sealing agent, under appropriate conditions, may be employed.

The tube 18 is preferably transparent or translucent so that the level of the sealing agent 28 therein may be observed. The tube 18 may be made of "Pyrex" or silica glass or other suitable material which will not soften or melt at the working temperatures.

The pumps 20 and 34 and valves 22 and 36 are preferably located remote or are insulated from the heat applied to the chamber 12 and applied by the coil 38.

If the particular sealant 28 used is susceptible to reaction with air, then nitrogen or other suitable inert gas may be used in place of air.

The tube arms 14 and 16 and stem 26 are of preferably small diameter so that the volume displaced by the head of liquid will have negligible effect on the volume of the chamber 12 and the volume in the vessel part 32. The tube dimensions under appropriate conditions may be on the order of one millimeter inside diameter for the arms 14 and 16 and on the order of two millimeters inside diameter for the stem 26, and the sealing and non-sealing levels in the tube could be a few inches apart.

In a pressurized system, the pumps 20 and 34 would be pressure pumps, and the cycle would be as follows. With the chamber 12 supplied with reactants and closed except at the tube arm 14, and the sealant 28 all solid and all in the vessel 30 and lower part of the tube stem 26, the sealant then being at a level at which it does not seal the arms 14 and 15 from each other, as shown in FIG. 1, The pumps are run until the desired pressure is established in the chamber 12 and the same or nearly the same pressure is established in the vessel space 32. The coil 38 is then energized to melt the sealant. When the sealant is melted, the pressure pump 34 is again run, until the sealant in the tube arms 14 and 16 reaches a suitable sealing level 40, thus sealing the arms 14 and 16 from each other and thereby sealing the tube side of the chamber 12. Then the coil 38 is deenergized, allowing the sealant to solidify in sealing position. Now the reaction in the chamber 12 can be commenced. When the reaction is completed, gas is valved out at 36 until substantially the original pressure is established in the vessel space 32, and then the coil 38 is energized to melt the solid sealant. When all of the sealant is melted, it gravitates to, or substantially to, its original level in the stem 26 and vessel 30. Then the coil 38 is deenergized and the sealant allowed to resolidify. When the sealant has thus resolidified, the valve 22 is opened to establish ambient atmospheric pressure in the chamber 12, and then the chamber is opened and the reaction products removed, essentially completing a cycle of operation. The valve 36 may be kept closed when the valve 22 is opened, or it may be opened if desired, to establish ambient atmospheric pressure over the sealant in the vessel space 32.

To preclude leakage due to voids that may form on solidification of the raised sealant, it is advisable to maintain the top portion of the sealant molten, particularly in that tube arm which is under greater pressure than the other tube arm, so that the molten sealant will be forced into the voids. Such greater pressure may exist over the sealant in the arm 14 by virtue of vapor caused by heating a liquid in the chamber 12, or by virtue of gases produced by the reaction. Or it could be brought about over the sealant in the arm 16 by use of the valve 22 in a vacuum system or use of the pump 20 in a positive pressure system.

For this purpose the system may include relatively small auxiliary heater coils 56 and 58 about the arms 14 and 16 respectively at the level of the top of the coil 38, and under the control of suitable switch means, such as the single-pole multiple-throw switch 60, which may have a null position for use if only the coil 38 is to be employed, or may selectively energize that small coil which is known to be at the high pressure side, or both small coils if desired. If either or both small coils are to be used, the selected small coil or both coils, as the case may be, is or are kept energized throughout the reaction, maintaining in a molten condition the selected one (FIGS. 3 and 4) or both (FIG. 5) of the top portions 62 and 64 of the raised sealant while the coil 38 is kept deenergized so that the remainder of the sealant remains solid. The coil 38 is reenergized to remelt the solid remainder of the sealant so that the sealant may gravitate as above noted, and the small coils may be deenergized after they have served their purpose.

Variable resistors 68 and 70 may be employed in the circuitry.

Obviously many modifications and variations of the invention are possible in the light of the above teachings. It is therefore to be understood that within the scope of the appended claims the invention may be practiced otherwise than as specifically described.

I claim:

1. In a sealing system, a chamber in which a chemical reaction is to take place, a first pump, a vessel, a Y-tube having first and second arms extending upward and a stem extending downward from the tube juncture, the arms leading respectively to the chamber and pump, the stem being connected to the vessel, a fusible solid sealant in the vessel and stem and entirely below the arms, a second pump leading to the vessel over the sealant outside the stem, means for activating the first pump to establish a desired pressure in the chamber, means for activating the second pump to establish substantially the same pressure on the sealant in the vessel outside the stem, a first heater for melting the sealant, means for activating the heater, means for increasing the pressure on the molten sealant outside the stem just enough to force molten sealant from the stem into both arms to a predetermined level at which the sealant will seal the first pump from the chamber, a second heater disposed adjacent one of the arms at said predetermined level, the first heater extending along the vessel and tube substantially to said predetermined level, means for inactivating the first heater and activating the second heater to enable all of the sealant except the top portion of the sealant in said one arm to resolidify, means for increasing the pressure over the sealant in said one arm, means operative after completion of the reaction in the chamber for substantially equalizing the pressure over the sealant in said one arm and the pressure over the sealant in the vessel outside the stem with the pressure in the chamber, the first heater being reactivatable to remelt the solid sealant to enable the sealant to gravitate and thus unseal the chamber and pump from each other, the first heater being reinactivatable to allow the sealant to resolidify in preparation for another cycle, and means operative after the latter resolidification for establishing ambient atmospheric pressure in the chamber.

2. In a sealing system, a chamber in which a chemical reaction is to take place, a first pump, a vessel, a Y-tube having first and second arms extending upward and a stem extending downward from the tube juncture, the arms leading respectively to the chamber and pump, the stem being connected to the vessel, a fusible solid sealant in the vessel and stem and entirely below the arms, a second pump leading to the vessel over the sealant outside the stem, means for activating the first pump to establish a desired pressure in the chamber, means for activating the second pump to establish substantially the same pressure on the sealant in the vessel outside the stem, heater means for melting the sealant, means for activating the heater means, means for increasing the pressure on the sealant in the vessel outside the stem just enough to force molten sealant into both arms to a predetermined level at which the sealant will seal the first pump from the chamber, the heater means extending along the vessel and along the tube adjacent the arms substantially to said predetermined level, means for inactivating the heater means to enable the sealant to resolidify, and means operative after completion of the reaction in the chamber for equalizing the pressures over the sealant in both arms and on the sealant in the vessel outside the stem, the heater means being re-activatable to melt the solid sealant to enable the sealant to gravitate and thus unseal the chamber, the heater means being reinactivatable to allow the sealant to resolidify, and means operative after the latter resolidification for establishing ambient atmospheric pressure in the chamber.

3. A sealing system, comprising a chamber in which a chemical reaction is to take place, a first vacuum pump, a vessel, a Y-tube having a pair of arms extending upward and a stem extending downward from the tube juncture, the arms leading respectively to the chamber and pump, the stem being connected to the vessel, a chemically inert fusible solid sealant in the stem and entirely below the arms and in the vessel outside the stem, a second vacuum pump leading to the vessel over the sealant outside the stem, heater means adjacent the sealant in the stem and vessel for melting the sealant, means for activating the heater means, the first pump being operative to establish a desired pressure in the chamber, the second pump being operative to establish substantially the same pressure on the sealant in the vessel outside the stem, and a bleeder connected to a source of gas inert to the sealant and leading to the vessel over the sealant outside the stem and operative when said pressures are established and the sealant is molten to admit gas to the vessel to an extent which will raise the molten sealant from the stem to the arms to a level at which the first pump is sealed from the chamber, the heater means being reinactivatable to allow the raised sealant to resolidify, and being re-activatable to remelt the resolidified sealant after the reaction is completed, the second pump being operative on remelting of the raised sealant to enable it to gravitate to a non-sealing level.

4. In a sealing system, a chamber in which a chemical reaction is to take place under vacuum, a first vacuum pump, a vessel, a Y-tube having first and second arms extending upward and a stem extending downward from the tube juncture, the arms leading respectively to the chamber and pump, the stem being connected to the vessel, a fusible solid sealant in the vessel and stem and entirely below the arms, a second vacuum pump leading to the vessel over the sealant outside the stem, a first heater for melting the sealant, a valve for establishing communication between the ambient atmosphere and the vessel over the sealant outside the stem, the valve being operative when the sealant is molten to increase the pressure on the sealant in the vessel outside the stem just enough to force molten sealant from the stem into both arms to a predetermined level at which the sealant will seal the first pump from the chamber, the heater extending along the vessel and along the tube substantially to said predetermined level, a second heater adjacent one of the arms at said level, a valve for establishing communication between the ambient atmosphere and said one arm, and means for activating the second heater and activating and inactivating the pumps, valves and first heater to sequentially establish substantially the same desired vacuum over the sealant in the vessel and stem, melt the sealant, force the molten sealant substantially to said level in both arms, allow the sealant to resolidify except for the top portion thereof in said one arm, increase the pressure over the sealant in said one arm by an amount to force the molten portion into voids resulting from solidification in the arms, reduce the pressure over the sealant in said one arm by said amount, remelt the sealant to enable it to gravitate out of the arms, allow the gravitated sealant to resolidify, and establish ambient atmospheric pressure in the chamber.

5. In a sealing system, a chamber in which a chemical reaction is to take place, a first pump, a vessel, a Y-tube having first and second arms extending upward and a stem extending downward from the tube juncture, the arms leading respectively to the chamber and pump, the stem being connected to the vessel, a fusible solid sealant in the vessel and stem and entirely below the arms, a second pump leading to the vessel over the sealant outside the stem, a valve for establishing communication between the ambient atmosphere and the vessel over the sealant outside the stem, a valve for establishing communication between the ambient atmosphere and the second arm, a main heater coil extending along the vessel and tube substantially to a predetermined sealing level, auxiliary heater coil means about the respective arms at the predetermined sealing level only, and means for activating and inactivating the pumps, valves, heater coil, and heater coil means to establish substantially the same desired pressure over the sealant in the vessel and stem, melt the sealant, raise molten sealant from the stem to the sealing level in both arms, allow the raised sealant to resolidify except at the tops thereof in the arms, substantially equalize the pressure over the solid sealant in the vessel outside the stem with the pressure over the sealant in the arms, remelt the solid sealant to enable sealant to gravitate out of the arms, allow the remelted sealant to resolidify, and establish ambient atmospheric pressure in the chamber.

6. In a sealing system, a chamber in which a chemical reaction is to take place, a first pressure pump, a vessel, a Y-tube having first and second arms extending upward and a stem extending downward from the tube juncture, the arms leading respectively to the chamber and pump, the stem being connected to the vessel, a fusible solid sealant in the vessel and stem and entirely below the arms, a second pressure pump leading to the vessel over the sealant outside the stem, means for activating the pumps to establish substantially the same desired pressure in the chamber and on the sealant in the vessel outside the stem, a first heater for melting the sealant, means for activating the heater, the second pump being operative to increase the pressure on the sealant in the vessel outside the stem just enough to force molten sealant into both arms to a predetermined level at which the sealant will seal the first pump from the chamber, a second heater disposed adjacent the second arm at said predetermined level, the first heater extending along the vessel and along the tube adjacent the arms substantially to said predetermined level, means for inactivating the first heater and activating the second heater to enable all of the sealant except the top portion of the sealant in the second arm to resolidify, the first pump being operative to increase the pressure over the sealant in the second arm, first and second valves connected respectively with the second arm and vessel and operative after completion of the reaction in the chamber to establish communication between the ambient atmosphere and the second arm and vessel for reducing the pressures in the second arm and vessel substantially to the pressure in the chamber, the first heater being re-activatable to remelt the solid sealant for enabling the sealant to gravitate and thus unseal the chamber and pump from each other, the first heater being reinactivatable to allow the sealant to resolidify in preparation for another cycle, the first valve being operative after the resolidification for establishing ambient atmospheric pressure in the chamber.

7. In a sealing system, a chamber in which a chemical reaction is to take place, a first pressure pump, a vessel containing a fusible solid sealant, a Y-tube having first and second arms extending upward and a stem extending downward from the tube juncture, the arms leading respectively to the chamber and pump, the stem being connected to the vessel and immersed in the sealant, the sealant being at a level at which it does not seal the arms from each other, a second pressure pump leading to the vessel over the sealant outside the stem, means for activating the pumps to establish substantially the same desired pressure in the chamber and on the sealant in the vessel outside the stem, heater means for melting the sealant, means for activating the heater means, the second pump being operative to increase the pressure on the sealant in the vessel outside the stem just enough to force molten sealant from the stem into both arms to a predetermined level at which the sealant will seal the first pump from the chamber, the heater means extending along the vessel and along the tube adjacent the arms substantially to said predetermined level, means for inactivating the heater means to enable the sealant to resolidify, a valve connected with the vessel and operative after completion of the reaction in the chamber to establish communication between the ambient atmosphere and the vessel for reducing the pressure on the sealant in the vessel outside the stem substantially to the pressure over the sealant in the arms, the heater means being re-activatable to remelt the sealant for enabling the sealant to gravitate and thus unseal the chamber and pump from each other, the heater means being reinactivatable to allow the gravitated sealant to resolidify in preparation for another cycle, and a valve operative after the latter resolidification for establishing ambient atmospheric pressure in the chamber.

References Cited in the file of this patent

UNITED STATES PATENTS

| | | |
|---|---|---|
| 2,531,143 | Malm et al. | Nov. 21, 1950 |
| 2,942,615 | Dayton | June 28, 1960 |
| 2,945,504 | Bredtschneider | July 19, 1960 |